Patented Nov. 19, 1940

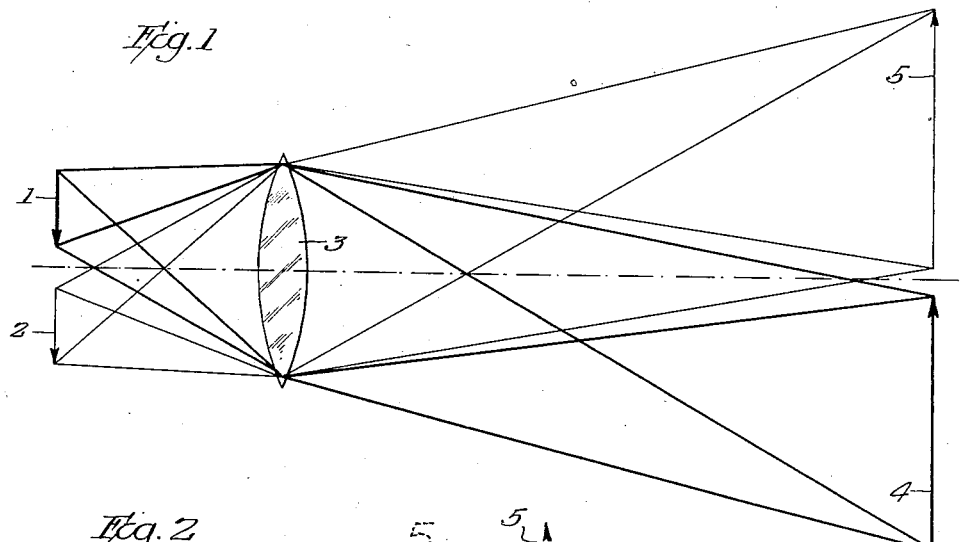
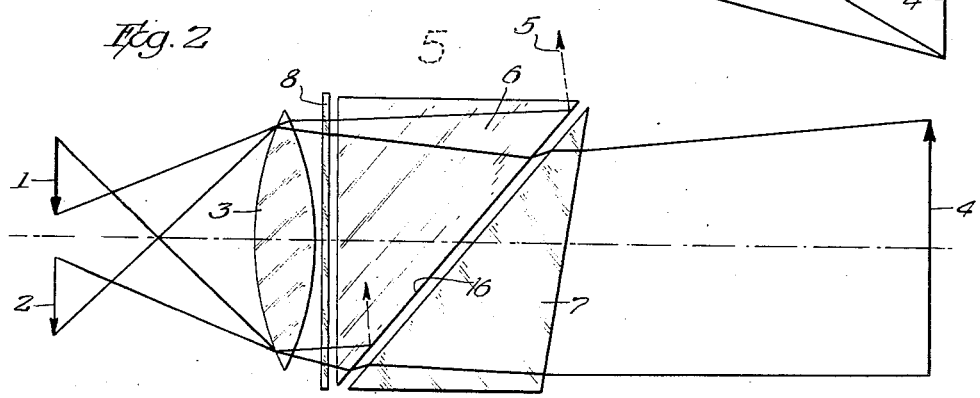
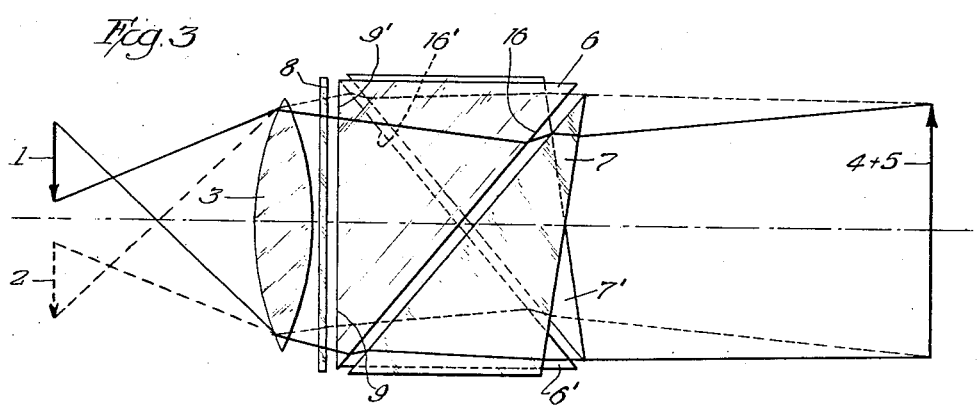

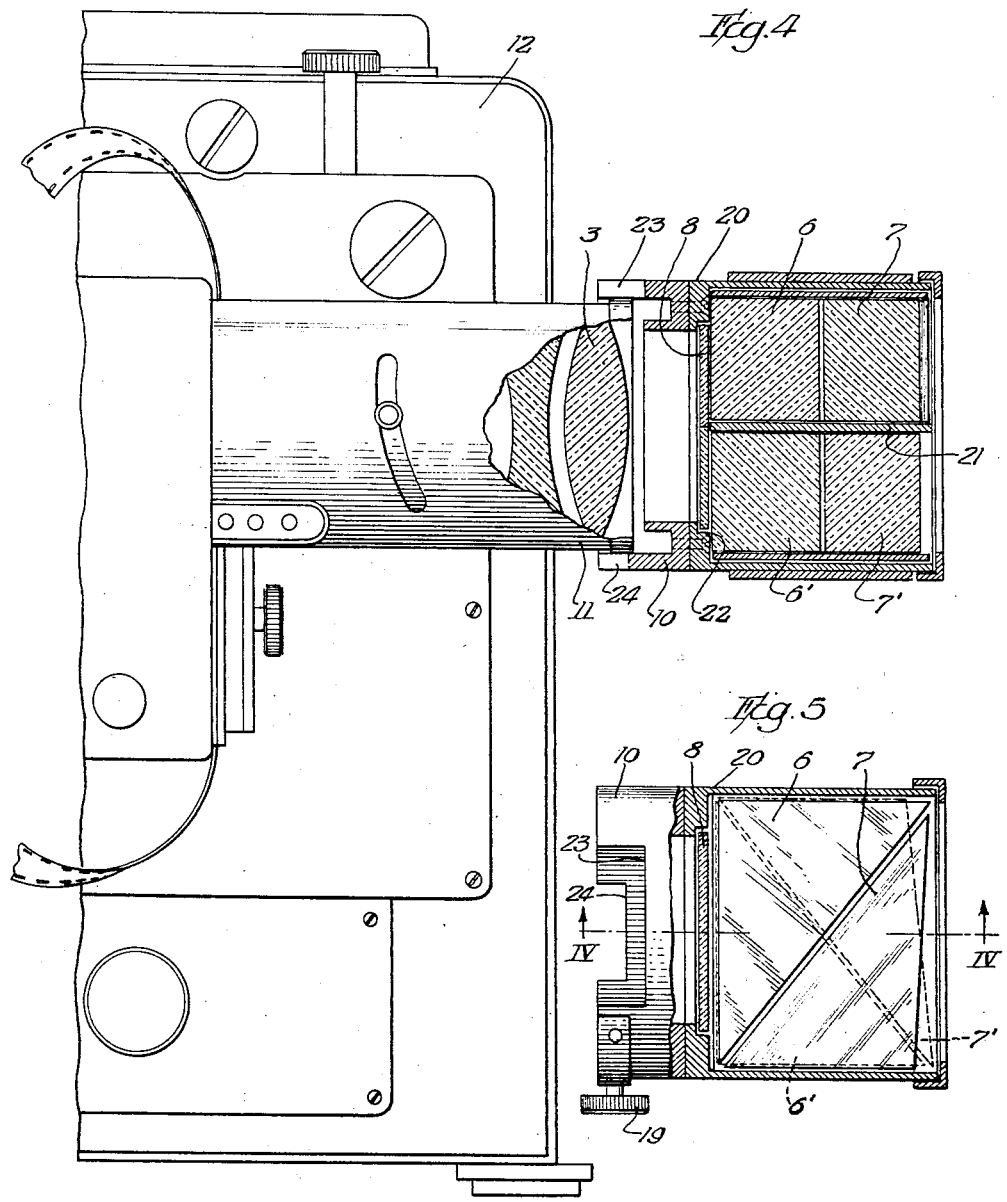

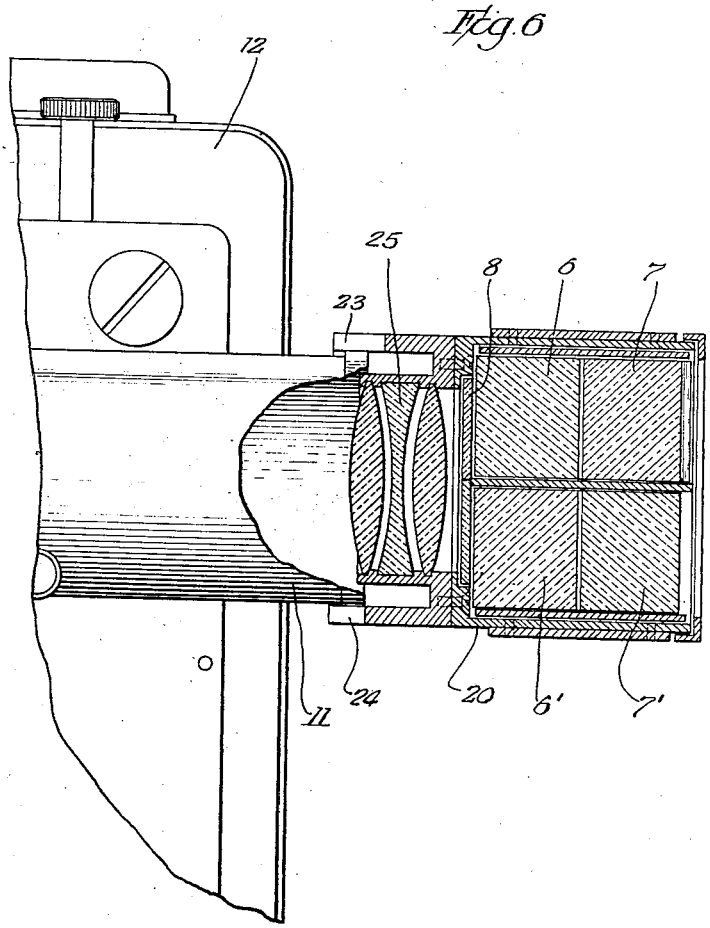

2,222,300

UNITED STATES PATENT OFFICE 2,222,300

MEANS FOR PROJECTING STEREOSCOPIC PICTURES

Werner Pistor, Dresden-Blasewitz, and Otto Vierling, Dresden, Germany, assignors to Zeiss Ikon Aktiengesellschaft, Dresden, Germany Application October 20, 1938, Serial No. 235,926
In Germany August 20, 1937

7 Claims. (Cl. 88—16.6)

This invention relates to improvements in the art of projecting stereoscopic pictures.

It is an object of the invention to provide an optical system for producing on a projection screen a single image of two stereoscopic pictures while eliminating the condition of double images frequently appearing alongside the desired projected images.

It is also an object of the invention to effect this elimination of the disturbing images without requiring the application of masks over any portion of the screen or any part of the projecting equipment.

It is, furthermore, an object of the invention to eliminate the projection of double images by deflecting laterally out of the system the rays of light which would lead to the production of the additional images by placing in the path a reflector of suitable inclination which permits passage of rays of light producing an image at a certain area.

Another object of the invention is to position in the path of the projecting rays of each of two stereo-pictures two prisms each presenting one of its hypothenusal face at such angle to the rays of one of the pictures, that the latter will be totally reflected, while the other of the two pictures projected through each prism will be deflected so that the two pictures which are not totally reflected will be in registry on the screen.

It has been proposed heretofore to interpose masks in the path of the rays of light emanating from a picture and thereby avoid the chromatic fringe which becomes apparent in stereoscopic projection. This mask, however, had the effect of reducing the size of the projected image. It also has been proposed to use special pairs of polarizers in each of the paths of rays emanating from the pictures to annihilate one of the two images projected from each picture. The insertion of polarizers of this type, however, has the disadvantage that it will lead to excessive rise of temperature and the polarizer also cuts down the intensity of light with which the picture is to be projected.

The present invention eliminates the appearance of double images on the screen by interposing in the path of the rays a surface or surfaces at which a material of a certain optical density is joined to material of an optically different density, the abutting surfaces being arranged in such manner that the rays of light emanating from one picture strike the surface within the limiting angle of total reflection, so as to pass through the set of prisms to be reflected while the rays of light producing the image pass through these adjoining faces without having been interfered with.

The projection of stereoscopic pictures is frequently carried out by means of transparent prismatic wedges which are interposed in the path of rays for producing the images of the two pictures upon exactly the same area on the screen and in registration with each other. Prismatic wedges preferably are used which are adapted to eliminate the chromatic disturbance caused by a fringe of color upon strong angular deflection of either or both images.

The achromatic wedges usually are arranged in front of the projecting lens with the wedges either separated along a horizontal plane or along a vertical plane, the bases of the two prisms or wedges being offset angularly relatively to each other.

The achromatic condition of the prisms is preferably brought about by assembling each prism of two wedges, each of a glass different from that of the other. It is then feasible to deflect, by means of a pair of achromatic wedges, one of the images away from the screen by arranging the base of one wedge at such angle to the path of light emanating from one of the stereoscopic pictures that this light is totally reflected at the surface where one wedge is joined to the companion wedge, and hence, is eliminated from the projection on the screen. The light from the other picture passes through the prism, while being merely deflected in accordance with laws of optics. One wedge assembly totally reflects the light from the first picture and permits projection of the second picture under deflection, while the other wedge assembly totally reflects the light from the second picture and permits the light of the first picture to pass through.

The optical data for a glass combination of this character may be calculated from the following formulas:

I $$\epsilon_1 = \frac{\delta_D \cdot \gamma_1}{(n_{1_D} - 1)\gamma_1 - \gamma_2}$$

and

II $$\epsilon_2 = \frac{\delta_D \cdot \gamma_2}{(n_{2_D} - 1)(\gamma_1 - \gamma_2)}$$

wherein:

$\delta_D$ is the total deflection of the achromatic wedges for the $Na_D$ — line.
$\epsilon_1$ the wedge angle for the first wedge.
$n_{1_D}$ the refraction index of the glass of the first wedge.
$\gamma_1$ the Abbe index of the glass for the first wedge.
$\epsilon_2$ the wedge angle for the second or companion wedge of the same wedge assembly.
$n_{2_D}$ the refraction index of the glass of the second wedge.
$\gamma_2$ the Abbe index of the glass for the second wedge.

If one face of this wedge assembly or prism is assumed to be in a plane at a right angle to the optical axis of the system, the light passing through that picture which is to be eliminated from projection will be totally reflected, if $\epsilon_1$ the wedge angle of the first wedge is equal to the limit angle of total reflection for the outermost ray of light.

$\epsilon_1$ will be found from the equation $$\sin \epsilon_1 = \frac{1}{n_{1_D}}$$

The glass of which this first wedge is to be made can be selected, and all of the values of the first equation excepting the Abbe index $\gamma_2$ will now be found from this Equation I. This will determine what type of glass to be used for the companion wedge of the wedge assembly. The refraction index of this glass also can readily be determined. It is then only necessary to determine from the second formula, the value $\epsilon_2$ which is the wedge angle for this companion wedge.

This assembly then meets three necessary requirements:

(1) The rays emanating from both stereoscopic pictures will be deflected in passing through the prism so that the two images are in registration on the screen.

(2) The second images are totally reflected and hence deflected away from the screen.

(3) The conditions leading to the production of a chromatic fringe are entirely avoided.

Embodiments of the invention are shown in the accompanying drawings, wherein:

Fig. 1 illustrates diagrammatically the projection of two pictures to furnish two images on a screen;

Fig. 2 shows diagrammatically the total reflection of the light emanating from the second picture, the rays of light emanating from the first picture pass through a wedge assembly, and Fig. 3 shows diagrammatically the production of a single image on the screen through the light passing through both stereoscopic pictures.

Fig. 4 shows partly in section and partly in elevation, a portion of a projector with a self-contained structure comprising the two wedges;

Fig. 5 is a section in part plan view of the self-contained structure of Fig. 4;

Fig. 6 is a part section and part elevation of a modified attachment similar to that shown in Fig. 4 combined with a lens, as used for stereoscopic projection.

In Fig. 1 the two pictures to be projected on the screen are indicated at 1 and 2. By interposing a projecting lens 3 in the path of light emanating from the pictures 1 and 2, there will appear on the screen two images 4 and 5, as conditioned by the insertion of the lens 3 into the path of the light.

Fig. 2 shows a single prism assembled from the wedges 6 and 7 in the path of the rays of light emanating from the pictures 1 and 2. It will be seen that this single prism made up of the wedges 6 and 7, whose hypothenusal faces are arranged adjacent each other and are separated by an air space permits the rays from the picture 1 to pass therethrough to produce the image 4 on the screen, under suitable deflection, while the hypothenusal surface 16 struck at certain angles by the rays emanating from the picture 2 is in such position that these last named rays are totally reflected by said hypothenusal surface 16. There will then appear on the screen solely the image 4 corresponding to the picture 1. The rays of light emanating from the picture 2 are deflected laterally away from the screen, as indicated at 5. By blackening the outer side of the wedge 6, this set of rays of light may be entirely absorbed.

In Fig. 3 a similar arrangement is diagrammatically shown in which, however, now two wedge assemblies are illustrated, each of which covers substantially one half of the objective 3. The rays of picture 2 pass through the second prism assembly 6', 7', to be projected on the screen while the rays of light emanating from picture 1 are totally reflected by the hypothenusal surface 16'. It will be noticed that the second wedge assembly 6', 7' positioned beneath the prism 6, 7 is also angularly offset with respect to the first prism 6, 7 even though the primary faces 9, 9' in each prism assembly are in vertical coplanar alinement. The angle of the hypothenusal reflecting surfaces 16, 16' is such that even the outermost rays of each picture will be totally reflected thereby.

In Fig. 3, therefore, a single image only apparently appears on the screen, which image however, is actually the registration projection 4, 5 of the two stereoscopic pictures 1, 2.

Figs. 2 and 3 also show a polarizing filter 8 in front of the wedge assembly or assemblies respectively. The polarizing direction for the light is offset 90 degrees in one-half of the filter 8 with respect to the other half, each half being coordinated to one of the wedge assemblies.

In Figs. 4 and 5, the two wedge assemblies 6, 7 and 6', 7' are mounted in a suitable housing 20 which is open at both ends and in which the assemblies may be separated from each other by an intervening sheet 21. The housing is flanged at 22 at one end, and this flange is united with an attachment piece or union 10. The flange 22 also serves for maintaining in position the polarizing filter 8, the upper half of which permits the light to pass therethrough in a predetermined direction while the lower half permits to pass light therethrough vibrating in a plane 90 degrees offset with respect to that of the upper half.

The attachment piece 10 may be positioned on the lens mounting 11 of the projector 12, by being telescoped over the free end of the lens mounting and being then fixed in position by the set screw 19. The application and removal of this self-contained structure comprising the housing 20 with the optical elements contained therein and the union 10 is facilitated owing to the provision of notches 23 and 24 in the front portion of the attachment piece.

If a structure of this character is applied to the ordinary projector without changing the optical equipment of the projector, the images appearing on the screen will then only be half the size of the images projected on the screen from ordinary film pictures. This is due to the fact that the stereoscopic pictures of each pair are arranged on approximately the area of a film picture of the ordinary size so that each of the stereoscopic pictures occupies one-half of the area only of the standard frame or picture.

If it is desired to produce images from stereoscopic pictures in accordance with the system described in the present application, and to bring the images in coincidence or registration on the screen, while at the same time utilizing a screen area of the same size which is used for the projection of standard film pictures, the lens of the projector must be selected accordingly.

Fig. 6 shows a self-contained structure in the form of an attachment suitable for converting the standard projector 12 into a projector for stereoscopic pictures which occupy on the screen approximately the same area as the images projected from standard film pictures. In the embodiment illustrated in Fig. 6, the attachment, therefore, is combined with an auxiliary lens 25 here shown as a compound lens made up of several units. The mounting 24 of this substitute or auxiliary lens is combined with the housing 20 of the two prisms 6, 7 and 6', 7'. The latter are united in the manner set forth in the present application with the differential polarizing filter 8, and the entire self-contained structure comprising the housing 20 and the lens mounting 24 is applied to the projector 12 preferably after the lens normally used for the projector has been removed from the mounting. The structure shown in Fig. 6 may be held in position on the mounting of the lens in the same manner in which this has been indicated in Fig. 5.

We claim:

1. A device for projecting a pair of stereoscopic pictures, comprising an objective positioned to transmit light rays from said pair of pictures, and two pairs of optical wedges positioned on that side of the objective away from said pair of pictures, each pair of wedges covering substantially one half of the objective and being adapted to project one of said two stereoscopic pictures onto a screen, each pair of wedges being arranged with their hypothenusal faces adjacent each other and separated by an air space, said hypothenusal faces being positioned at such an angle to the optical axis of the objective that the light rays from the stereoscopic picture associated with the other pair of optical wedges strike the hypothenusal faces within the limit angle of total reflection and are reflected, while the light rays from the other one of the pair of stereoscopic pictures pass unobstructed through said faces to the screen.

2. A device for projecting a pair of stereoscopic pictures, comprising an objective positioned to transmit light rays from said pair of pictures, and two pairs of achromatic wedges positioned on that side of the objective away from said pair of pictures, each pair of wedges covering substantially one half of the objective and being adapted to project one of said two stereoscopic pictures onto a screen, each pair of wedges being arranged with their hypothenusal faces adjacent each other and separated by an air space, said hypothenusal faces being positioned at such an angle to the optical axis of the objective that the light rays from the stereoscopic picture associated with the other pair of achromatic wedges strike the hypothenusal faces within the limit angle of total reflection and are reflected, while the light rays from the other one of the pair of stereoscopic pictures pass unobstructed through said faces to the screen.

3. A device for projecting a pair of stereoscopic pictures, comprising an objective positioned to transmit light rays from said pair of pictures, and two pairs of optical wedges positioned on that side of the objective away from said pair of pictures, each pair of wedges covering substantially one half of the objective and being adapted to project one of said two stereoscopic pictures onto a screen, each pair of wedges being arranged with their hypothenusal faces adjacent each other and separated by an air space, said hypothenusal faces being positioned at such an angle to the optical axis of the objective that the light rays from one of said two stereoscopic pictures strike the hypthenusal faces within the limit angle of total reflection and are reflected, while the light rays from the other one of said two stereoscopic pictures pass unobstructed through said faces to the screen, the second wedge of each pair of wedges through which the light rays from one of said stereoscopic pictures are adapted to pass having such a wedge angle that the two images projected by said two pairs of wedges onto the screen appear on the latter in registration.

4. A device for projecting a pair of stereoscopic pictures, comprising an objective positioned to transmit light rays from said pair of pictures, and two pairs of achromatic wedges positioned on that side of the objective away from said pair of pictures, each pair of wedges covering substantially one half of the objective and being adapted to project one of said two stereoscopic pictures onto a screen, each pair of wedges being arranged with their hypothenusal faces adjacent each other and separated by an air space, said hypothenusal faces being positioned at such an angle to the optical axis of the objective that the light rays from one of said two stereoscopic pictures strike the hypothenusal faces within the limit angle of total reflection and are reflected, while the light rays from the other one of said two stereoscopic pictures pass unobstructed through said faces to the screen, the second wedge of each pair of wedges through which the light rays from one of said stereoscopic pictures are adapted to pass having such a wedge angle that the two images projected by said two pairs of wedges onto the screen appear on the latter in registration.

5. A device for projecting a pair of stereoscopic pictures, comprising an objective positioned to transmit light rays from said pair of pictures, and two pairs of achromatic wedges positioned on that side of the objective away from said pair of pictures, each pair of wedges covering substantially one half of the objective and being adapted to project one of said two stereoscopic pictures onto a screen, each pair of wedges being arranged with their hypothenusal faces adjacent each other and separated by an air space, said hypothenusal faces being positioned at such an angle to the optical axis of the objective that the light rays from one of said two stereoscopic pictures strike the hypothenusal faces within the limit angle of total reflection and are reflected, while the light rays from the other one of said two stereoscopic pictures pass unobstructed through said faces to the screen, and two polarizing filters, one for each half of said objective and mounted between the latter and the respective pair of achromatic wedges the polarizing planes of said polarizing filters being at a right angle to each other.

6. An attachment for a picture projector adapted for projecting a pair of stereoscopic pictures on a screen to form a single image thereon, comprising a self-contained structure detachably securable to the objective mounting of the projector and including in a mount two pairs of optical wedges in superposed relation, each pair of wedges covering one half of the projector objective when said attachment is mounted on the projector objective mounting, each pair of wedges being arranged with their hypothenusal faces adjacent each other and separated by an air space, said hypothenusal faces being positioned at such an angle to the optical axis of the objective that the light rays from one of said two stereoscopic pictures strike the hypothenusal faces within the limit angle of total reflection and are reflected, while the light rays from the other one of said two stereoscopic pictures pass unobstructed through said faces to the screen.

7. An attachment for a picture projector adapted for projecting a pair of stereoscopic pictures on a screen to form a single image thereon, comprising a self-contained structure detachably securable to the objective mounting of the projector and including in a mount two pairs of optical wedges in superposed relation, each pair of wedges covering one half of the projector objective when said attachment is mounted on the projector objective mounting, each pair of wedges being arranged with their hypothenusal faces adjacent each other and separated by an air space, said hypothenusal faces being positioned at such an angle to the optical axis of the objective that the light rays from one of said two stereoscopic pictures strike the hypothenusal faces within the limit angle of total reflection and are reflected, while the light rays from the other one of said two stereoscopic pictures pass unobstructed through said faces to the screen, and a polarizing filter for each of said pairs of wedges and fixedly mounted in that end of the mount which is attached to the objective mounting of the projector, the polarizing planes of said polarizing filters being positioned at a right angle to each other.

WERNER PISTOR.
OTTO VIERLING.